(12) United States Patent
Koga

(10) Patent No.: US 6,501,940 B1
(45) Date of Patent: Dec. 31, 2002

(54) INFORMATION COLLECTION SYSTEM UTILIZING PORTABLE MOBILE COMMUNICATION SYSTEM

(75) Inventor: Takahiro Koga, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/369,878

(22) Filed: Aug. 9, 1999

(30) Foreign Application Priority Data

Aug. 10, 1998 (JP) .......................................... 10-226089

(51) Int. Cl.[7] .............................. H04B 7/15; H04B 1/38; H04B 7/185; H04M 3/42; H04Q 7/20; G06F 17/00; G06F 17/60
(52) U.S. Cl. ...................... 455/11.1; 455/414; 455/507; 455/575; 455/13.1; 700/236; 705/22
(58) Field of Search ............................... 455/11.1, 422, 455/517, 507, 509, 575, 88, 414, 13.1; 340/825.35, 825.06, 825.69, 825.72; 700/236; 705/22

(56) References Cited

U.S. PATENT DOCUMENTS 5,142,694 A * 8/1992 Jackson et al. ............. 455/67.1
5,815,795 A * 9/1998 Iwai ............................... 455/9
5,883,884 A * 3/1999 Atkinson ..................... 370/279
5,890,055 A * 3/1999 Chu et al. ..................... 455/16

FOREIGN PATENT DOCUMENTS

| JP | 9-261151 | 3/1997 |
| JP | 11-187453 | 9/1997 |

* cited by examiner

*Primary Examiner*—Edward F. Urban
*Assistant Examiner*—Meless Zewdu
(74) *Attorney, Agent, or Firm*—Foley & Lardner

(57) ABSTRACT

The invention provides a less expensive and highly reliable information collection system for vending machines or like machines which efficiently utilizes extension radio communication of a portable radio communication system such as PHS and outside radio communication. Each information source (e.g., each parent machine, child machine and grandchild machine) is an object of information collection of the information collection system, and is provided with an extension/outside radio communication section capable of transmitting information by outside radio communication (e.g., via a portable mobile communication system) and by extension radio communication. An extension/outside communication switching section is provided for switching communication by the extension/outside radio communication section between extension radio communication and outside radio communication.

6 Claims, 6 Drawing Sheets

INFORMATION COLLECTION SYSTEM UTILIZING PORTABLE MOBILE COMMUNICATION SYSTEM

BACKGROUND OF THE INVENTION

1. Field of the Invention

The present invention relates to an information collection system which utilizes a portable mobile communication system such as the PHS (personal handy phone system) to collect data of vending machines or like apparatus to an information collection center.

2. Description of the Related Art

An information collection system which utilizes a portable mobile communication system such as the PHS conventionally has such a construction as shown in FIG. 3. Referring to FIG. 3, the information collection system shown includes a vending apparatus 112 and a coin handling apparatus 113. The vending apparatus 112 and the coin handling apparatus 113 are connected through an interface 111 to and controlled by a central processing unit (CPU) 110 which executes required controlling operation in accordance with a program. A ROM 114 in which an operation program is stored, a RAM 115 and an information communication apparatus 116 are connected to the CPU 110 over; a bus line 117. The RAM 115 has a storage section for storing transmission data such as sales data, sellout information, failure information and abnormality information. The CPU 110 tabulates, for each selling, an amount of sales of the vending machine and stores the tabulated amount of sales into the storage section of the RAM 115 or stores, if it detects a sellout, a failure or a like event, such information into the storage section.

FIG. 4. shows a construction of a conventional PHS terminal equipment attached to the vending machine. Referring to FIG. 4, the PHS terminal equipment 101 shown includes a control section 102 having a memory, a radio section 103, a vending machine interface 104, a voice codec 105, and a voice band modem 106. The vending machine interface 104 is connected for communication with the information communication apparatus 116 of the vending machine and receives transmission data such as sales data, sellout information, failure information and abnormality information from the vending machine. If transmission data is received from the vending machine through the vending machine interface 104, then the control section 102 controls the voice band modem 106 to convert the data into voice data, and a modem signal of the voice data is converted by the voice codec 105 into a signal which can be transmitted by the PHS. Then, the resulting signal is transmitted as radio data from the radio section 103.

FIG. 5 shows a conventional information collection apparatus which makes use of a combination of PHS transmission and a telephone circuit. Referring to FIG. 5, a PHS terminal equipment 101 communicates with a PHS base station 107, which in turn communicates data with a center 120 over a telephone circuit. In this instance, a center call origination method wherein the center originates a call to collect sales data or a terminal call origination method wherein failure or sellout information or abnormality information is transmitted on the real time basis from a vending machine 109 can be selectively employed. According to the center call origination method, sales data or failure information is collected at a fixed time at night so that the number of commodities to be delivered to each vending machine the next day or a countermeasure against a failed machine can be determined. According to the terminal call origination method, since transmission can be effected at a point of time when failure or abnormality occurs, an immediate countermeasure can be taken and the time within which sales is disabled can be reduced.

FIG. 6 shows a conventional information collection apparatus which does not make use of a telephone circuit. Referring to FIG. 6, a PHS terminal equipment 101 communicates with a portable PHS terminal equipment 121. The portable PHS terminal equipment 121 includes a control section 102, a radio section 103, a voice codec 105 and a voice band modem 106 similarly to the PHS terminal equipment 101 and can effect transmission or reception in a communication area of the PHS terminal equipment 101. Accordingly, a manager of such vending machines can collect data from all of such vending machines 109 which are located in the communication area even if the manager does not approach the vending machines. In particular, if a signal is received by the radio section 103, then the PHS terminal equipment 101 stores the signal data into the memory of the control section 102.

In a certain example of use of the portable PHS terminal equipment 121, while the manager remains on a commodity delivery car 122, it can collect data, take out a necessary quantity of commodities based on the collected data from the commodity delivery car 122 and carry the commodities to the vending machine 109. In this instance, the portable PHS terminal equipment 121 preferably has a function of processing data of information stored in the memory of the control section 102 and displaying or printing a result of the data processing on a display unit or by means of a printer.

In this manner, with the conventional information collection system, data can be collected from vending machines even if a telephone circuit is not directly connected to the vending machines. However, since direct outside radio communication is employed between the vending machines and the information collection center, the vending machines must be installed within an area within which such outside radio communication is possible. Therefore, the conventional information collection system has a problem in that the locations at which vending machines configured for information collection may be installed are limited.

Further, with the conventional information collection system, where a vending machine of an object of information collection is installed outside an area in which outside radio communication is possible, such that information cannot be communicated between the vending machine and the information collection center, collection of information from the vending machine is impossible unless an investigator intentionally visits an outside radio communication area adjacent the vending machine to collect information. This signifies that information collection cannot be performed automatically, and consequently, the conventional information collection system has a problem in that it requires a high running cost.

SUMMARY OF THE INVENTION

It is an object of the present invention to provide an information collection system that is inexpensive and highly reliable.

In order to attain the object described above, according to the present invention, each information source that is an object of information collection by the information collection system (e.g. a vending machine) is provided with an extension/outside radio communication section and an extension/outside communication switching section. The extension/outside radio communication section is capable of transmitting information by extension radio communication and by outside radio communication using a portable mobile communication system such as PHS. The extension/outside communication switching section is for switching communication by the extension/outside radio communication section between extension radio communication and outside radio communication, so that extension radio communication of the portable mobile communication system and outside radio communication can be used efficiently.

More particularly, according to an aspect of the present invention, there is provided an information collection system that utilizes a portable mobile communication system to collect information, comprising a base station connected to an information collection center over a telephone circuit, a parent machine for principally effecting outside radio communication with the base station, and a plurality of child machines for principally effecting extension radio communication with the parent machine. Each of the parent machine and the child machines act as an information source. An extension/outside radio communication section provided in each of the parent machine and the child machines is capable of transmitting information of the machine itself or information from another one of the machines to the base station and another one of the machines by outside radio communication, as well as transmitting the information to another one of the machines by extension radio communication. An extension/outside communication switching section provided in each of the parent machine and the child machines switches communication by the extension/outside radio communication section between extension radio communication and outside radio communication.

Each of the parent machine and the child machines may be a vending machine.

The portable radio communication system may be a personal handyphone system.

According to another aspect of the present invention, there is provided an information collection system that utilizes a portable mobile communication system to collect information, comprising a base station connected to an information collection center over a telephone circuit, a parent machine for principally effecting outside radio communication with the base station, a plurality of child machines for principally effecting extension radio communication with the parent machine, and a plurality of grandchild machines divided into groups corresponding to the child machines for principally effecting extension radio communication with the child machines. Each of the parent machine, the child machines and the grandchild machines act as an information source. An extension/outside radio communication section in each of the parent machine, the child machines and the grandchild machines is capable of transmitting information of the machine itself or information from another one of the machines to the base station and another one of the machines by outside radio communication, as well as transmitting the information to another one of the machines by extension radio communication. An extension/outside communication switching section is provided in each of the parent machine, the child machines and the grandchild machines for switching communication by the extension/outside radio communication section between extension radio communication and outside radio communication.

Each of the parent machine, the child machines and the grandchild machines may be a vending machine.

The portable radio communication system may be a personal handyphone system.

With each of the information collection systems of the present invention described above, although there is some limitation that objects of information collection (e.g., vending machines) must be installed in an area in which extension radio communication is possible, if such areas are connected to each other, then information owned by the information collection objects can be transmitted to the information collection center almost without making use of information transmission by outside radio communication. Consequently, the information collection system is advantageous in that it requires a comparatively low running cost.

Further, since extension radio communication and outside radio communication are utilized in combination, continuous information transmission is allowed without stopping the system, and the information collection system exhibits augmented reliability.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

Figure 1:
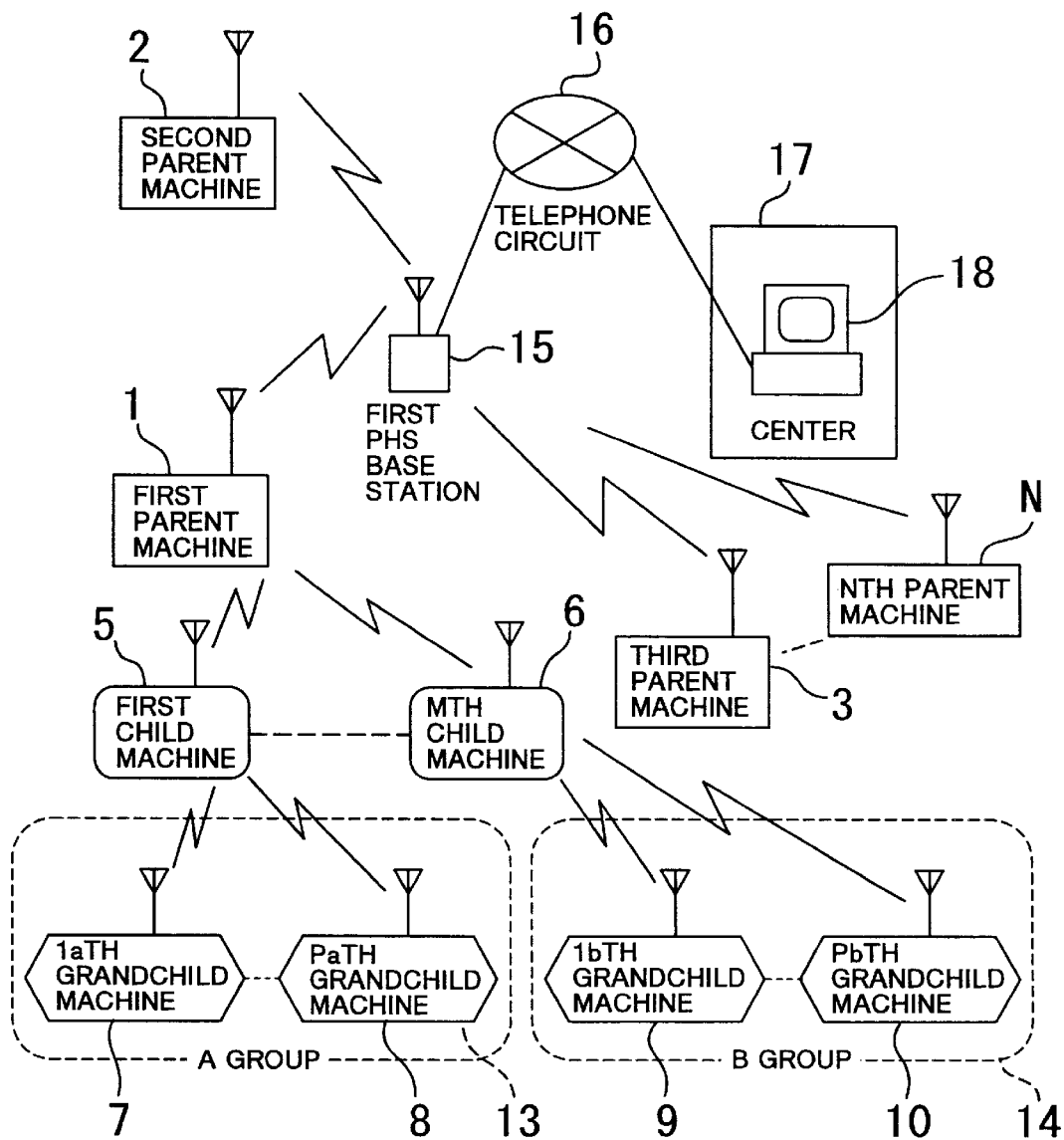
FIG. 1 is a block diagram showing an information collection system to which the present invention is applied.

Referring to FIG. 1, there is shown an information collection system to which the present invention is applied. The information collection system shown includes a plurality of minimum units of information collection objects, that is, information sources, each of which is a vending machine. Each of the vending machines has a PHS terminal equipment and can effect outside radio communication with a PHS base station and extension radio communication with another vending machine.

Thus, in the following description, that vending machine which normally effects outside radio communication with the PHS base station is referred to as parent machine, and that vending machine which normally effects extension radio communication with a parent machine is referred to as child machine. Further, that vending machine which normally effects extension radio communication with a parent machine through a child machine is referred to as grandchild machine.

The information collection system shown in FIG. 1 includes: first to Nth (N is a positive integer other than 0 or 1) parent machines 1 to N; a PHS base station 15 that effects outside radio communication with one of the first to Nth parent machines 1 to N, for example, the first parent machine 1; a telephone circuit 16 to which the first PHS base station 15 is connected; a central control computer 18 of an information collection center 17 that effects information communication over the telephone circuit 16; a first child machine 5 to an Mth child machine 6 (M is a positive integer other than 0 or 1), which effect extension radio communication with the first to Nth parent machines; a 1ath grandchild machine 7, and a 2ath grandchild machine 11 to a Path grandchild machine 8 (P is a positive integer other than 0, 1 or 2) which effect extension radio communication with the first to Mth child machines. The grandchild machines are divided into groups. Particularly in FIG. 1, a group of those grandchild machines which effect extension radio communication with the first child machine 5 to transmit information owned thereby to the central control computer 18 is hereinafter referred to as A group 13, and another group of those grandchild machines which effect extension radio communication with the Mth child machine 6 to transmit information owned thereby to the central control computer 18 is hereinafter referred to as B group 14.

It is to be noted that all of the vending machines which are minimum units of the information collection system of the present embodiment have a common construction and are not different in internal construction from each other. In particular, each of the vending machines includes an extension/outside radio communication section which can transmit information of the machine itself or information from another machine to the PHS base station and another machine by outside radio communication and can transmit such information to another machine by extension radio communication, and an extension/outside communication switching section for switching communication by the extension/outside radio communication section between extension radio communication and outside radio communication.

Now, operation of the information collection system of the present embodiment is described with reference to FIGS. 1 and 2.

Information owned by the 1ath grandchild machine 7 which belongs to the A group 13 such as, for example, sales data of the vending machine, that is, proceeds data, stocks of commodities, change balance data and so forth and data regarding failure or the like, is transmitted to the central control computer 18 of the information collection center 17 usually by extension radio communication with the first child machine 5, extension radio communication between the first child machine 5 and the first parent machine 1, outside radio communication between the first parent machine 1 and the PHS base station 15, and over the telephone circuit 16. Transmission is managed by the central control computer 18. Also, information owned by a grandchild machine which belongs to the B group 14 is transmitted to, and managed by, the central control computer 18 by a similar method and through a similar route. Since all of the parent machines, child machines and grandchild machines include an extension/outside radio communication section and an extension/outside communication switching section, information transmission is performed by selecting, from among extension radio channels and outside radio channels, a channel that is less expensive and can transmit information with certainty.

Figure 2:
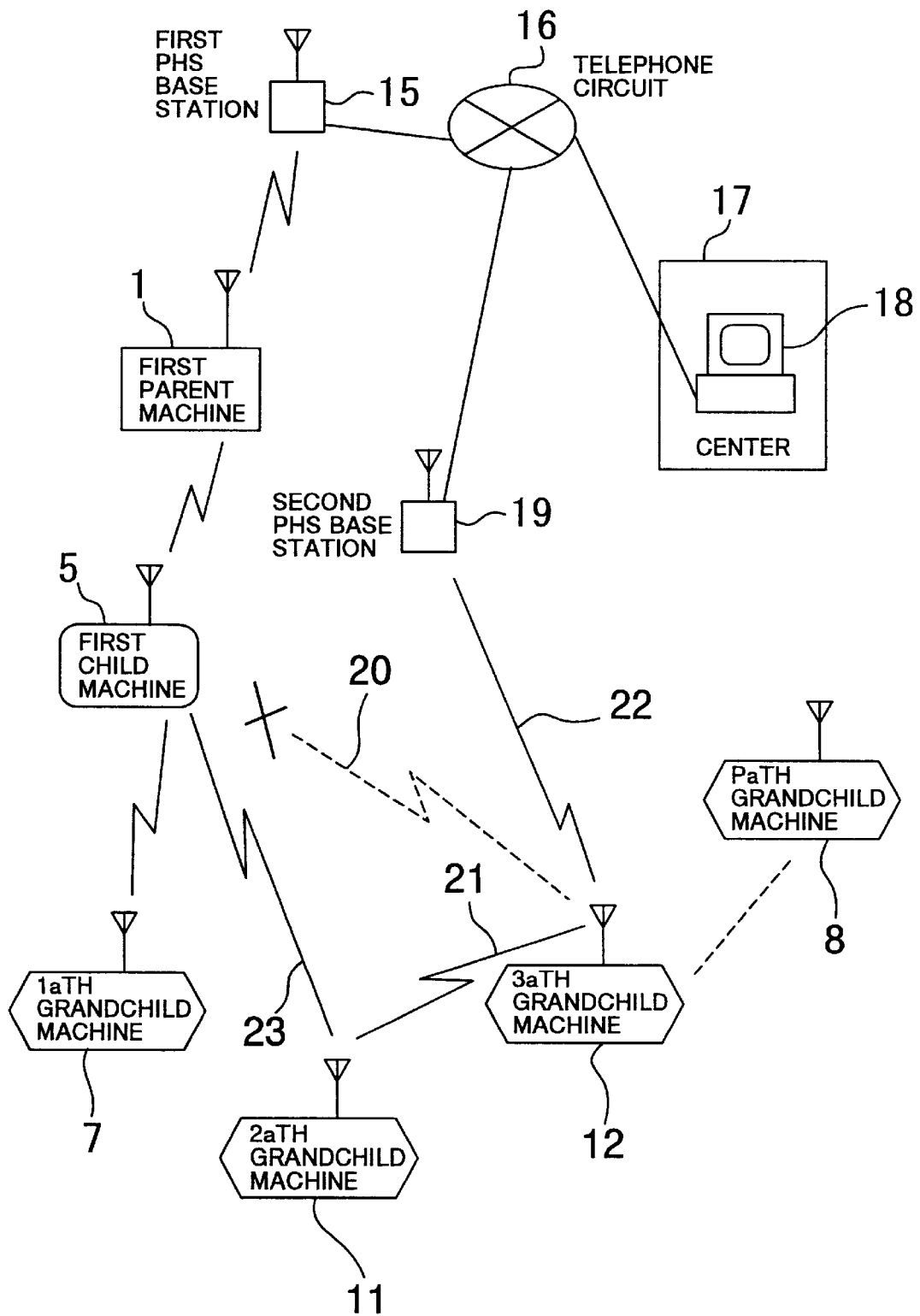
FIG. 2 is a block diagram illustrating operation of the information collection system of FIG. 1.
Figure 3:
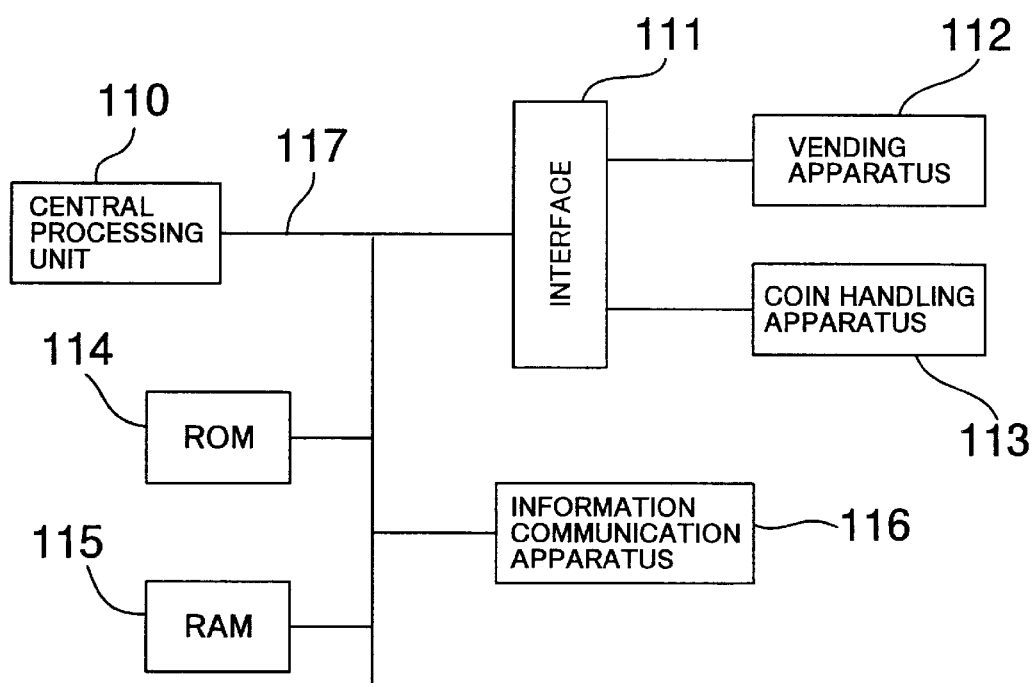
FIG. 3 is a block diagram showing a conventional information collection system which utilizes the PHS.
Figure 4:
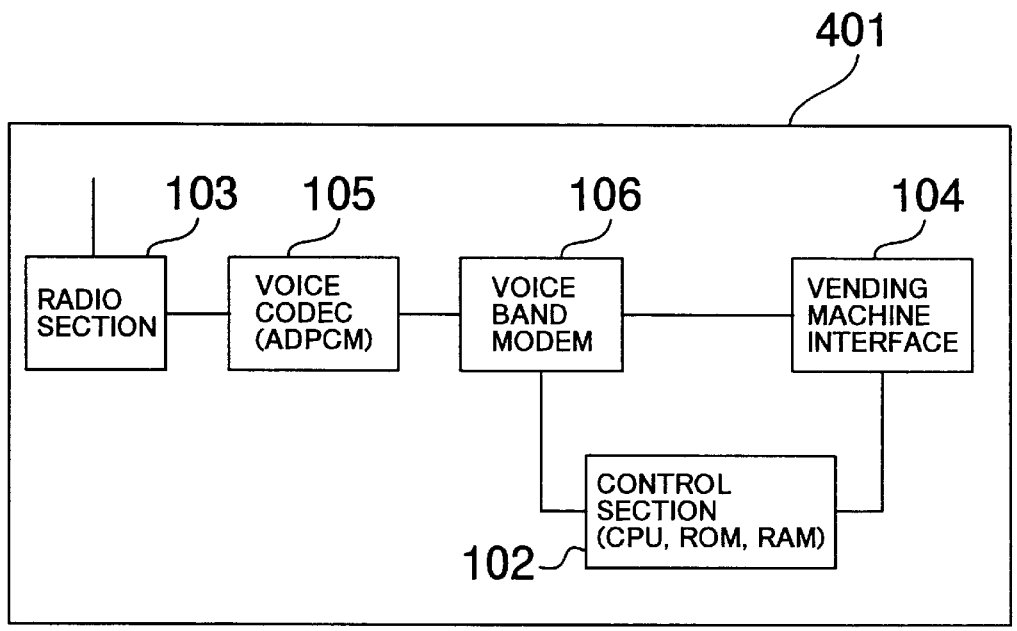
FIG. 4 is a block diagram showing a conventional PHS terminal equipment attached to a vending machine.
Figure 5:
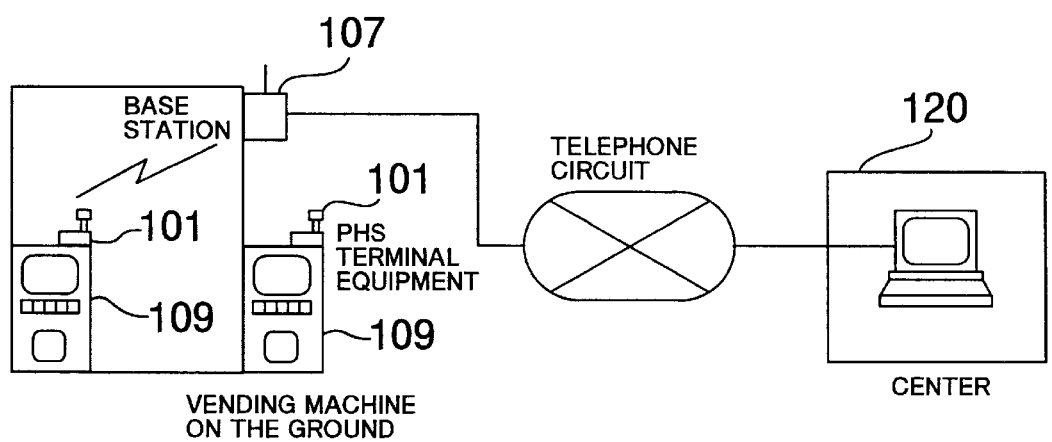
FIG. 5 is a block diagram showing a conventional information collection apparatus which utilizes a combination of PHS transmission and a telephone circuit.
Figure 6:
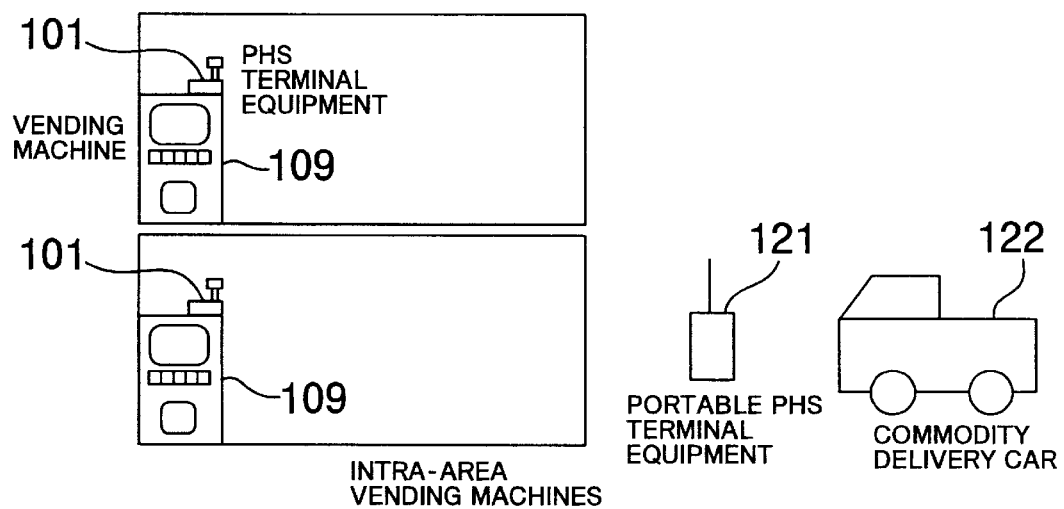
FIG. 6. is a block diagram showing another conventional information collection apparatus which does not utilize a telephone circuit.

Accordingly, for example, if the 3ath grandchild machine 12 cannot effect extension radio communication with the first child machine 5 over an extension radio channel 20 because of communication trouble as seen in FIG. 2, then information is transmitted automatically to the central control computer 18 either over an extension radio channel 21, through the 2ath grandchild machine 11, or by outside radio communication with a second PHS base station 19, which is in the nearest to the 3ath grandchild machine 12, over an outside radio channel 22.

Consequently, the information collection system of the present embodiment allows continuous information transmission without stopping the system and thus has augmented reliability.

It is to be noted that the present invention is not limited to the specific embodiment described hereinabove and can be applied to a configuration which does not include such grandchild machines as described above. Further, the present invention can be applied also to an information collection system which employs not the PHS but any other portable mobile communication system such as a portable telephone system.

What is claimed is:

1. An information collection system which utilizes a portable mobile communication system to collect information, comprising:
   a base station connected to an information collection center over a telephone circuit;
   a parent machine for principally effecting outside radio communication with said base station;
   a plurality of child machines for principally effecting extension radio communication with said parent machine;
   a plurality of grandchild machines for principally effecting extension radio communication with one or more of said child machines, each of said parent machine, said child machines and said grandchild machines acting as an information source;
   an extension/outside radio communication section provided in each of said parent machine, said child machines and said grandchild machines said extension/outside radio communication section configured to:
   (1) transmit information of the respective machine itself or information from another one of the machines to said base station by outside radio communication;
   (2) transmit said information to another one of the machines by extension radio communication; and
   (3) in the case of said grandchild machines, detect whether an attempted communication to one of said child machines fails, and if said attempted communication fails, transmit said information to another one of said grandchild machines;
   an extension/outside communication switching section provided in each of said parent machine, said child machines and said grandchild machines for switching communication by said extension/outside radio communication section between extension radio communication and outside radio communication.

2. An information collection system as claimed in claim 1, wherein each of said parent machine, said child machines, and said grandchild machines is a vending machine.

3. An information collection system as claimed in claim 1, wherein said portable radio communication system is a personal handyphone system.

4. An information collection system which utilizes a portable mobile communication system to collect information, comprising;
   a base station connected to an information collection center over a telephone circuit;
   a parent machine for principally effecting outside radio communication with said base station;

a plurality of child machines for principally effecting extension radio communication with said parent machine;

a plurality of grandchild machines divided into groups corresponding to said child machines for principally effecting extension radio communication with said child machines;

each of said parent machine, said child machines and said grandchild machines acting as an information source;

an extension/outside radio communication section provided in each of said parent machine, said child.machines and said grandchild machines, said extension/outside radio communication section configured to:
 (1) transmit information of the respective machine itself or information from another one of the machines to said base station by outside radio communication; and
 (2) transmit the information to another one of the machines by extension radio communication; and
 (3) in the case of said grandchild machines, detect whether an attempted communication to one of said child machines fails, and if said attempted communication fails, transmit said information to another one of said grandchild machines;

an extension/outside communication switching section provided in each of said parent machine, said child machines and said grandchild machines for switching communication by said extension/outside radio communication section between extension radio communication and outside radio communication.

5. An information collection system as claimed in claim 4, wherein each of said parent machine, said child machines and said grandchild machines is a vending machine.

6. An information collection system as claimed in claim 4, wherein said portable radio communication system is a personal handyphone system.

* * * * *